United States Patent
Uchiyama et al.

(10) Patent No.: US 6,638,582 B1
(45) Date of Patent: Oct. 28, 2003

(54) PHASE DIFFERENCE FILM, PHASE DIFFERENCE FILM COMPOSITE AND LIQUID CRYSTAL DISPLAY DEVICE USING THE SAME

(75) Inventors: Akihiko Uchiyama, Hino (JP); Takashi Kushida, Hino (JP)

(73) Assignee: Teijin Limited, Osaka (JP)

( * ) Notice: Subject to any disclaimer, the term of this patent is extended or adjusted under 35 U.S.C. 154(b) by 316 days.

(21) Appl. No.: 09/806,342

(22) PCT Filed: Jul. 28, 2000

(86) PCT No.: PCT/JP00/05118

§ 371 (c)(1),
(2), (4) Date: Mar. 29, 2001

(87) PCT Pub. No.: WO01/09649

PCT Pub. Date: Feb. 8, 2001

(30) Foreign Application Priority Data

Jul. 29, 1999 (JP) .......................... 11-214939

(51) Int. Cl.⁷ .............................................. C09K 19/00
(52) U.S. Cl. ........................... 428/1.2; 428/1.3; 428/1.1
(58) Field of Search ........................ 428/1.1, 1.2, 1.21, 428/1.23, 1.25, 1.26, 1.27, 1.28, 1.3, 1.31, 1.32, 1.4, 1.51, 1.6

(56) References Cited

FOREIGN PATENT DOCUMENTS

| EP | 0 554 130 A1 | 8/1993 | ............ G02F/1/1335 |
|---|---|---|---|
| JP | 3-29921 | 2/1991 | ............ G02F/1/133 |
| JP | 6-230368 | 8/1994 | ............ G02F/1/1335 |
| JP | 8-160222 | 6/1996 | ............ G02B/5/30 |
| JP | 8-240716 | 9/1996 | ............ G02B/5/30 |
| JP | 2609139 | 2/1997 | ............ G02B/5/30 |
| JP | 9-297216 | 11/1997 | ............ G02B/5/30 |
| JP | 9-297218 | 11/1997 | ............ G02B/5/30 |
| JP | 10-68816 | 3/1998 | ............ G02B/5/30 |
| JP | 2774114 | 4/1998 | ............ C08F/220/22 |

OTHER PUBLICATIONS

International Search Report.

*Primary Examiner*—Mark F. Huff
*Assistant Examiner*—Jennifer R. Sadula
(74) *Attorney, Agent, or Firm*—Sughrue Mion, PLLC (57) ABSTRACT

A retardation film that can compensate for the optical properties of the liquid crystal cells of a liquid crystal display device and thereby enhance image quality. The retardation film consists of a single polymer film, which has a wavelength range in which the retardation value is positive and a wavelength range in which it is negative in a wavelength range of 400–800 nm, and which satisfies the following inequality (1) and/or (2) and has a water absorption of no greater than 1% by mass.

$|R(400)| \geq 10$ nm  (1)

$|R(700)| \geq 10$ nm  (2)

15 Claims, 4 Drawing Sheets

Fig.9

PHASE DIFFERENCE FILM, PHASE DIFFERENCE FILM COMPOSITE AND LIQUID CRYSTAL DISPLAY DEVICE USING THE SAME

This application is a 371 of PCT/JP00/05118 Jul. 28, 2000.

TECHNICAL FIELD

The present invention relates to a novel retardation film. More specifically, it relates to a retardation film with novel optical properties that is useful for an optical element such as a liquid crystal display device or anti-glare film, to a laminated retardation film and retardation film-integrated polarizing film employing it, and to optical apparatuses such as liquid crystal display devices that employ the films.

BACKGROUND ART

Retardation films are used in STN (Super Twisted Nematic) systems of liquid crystal display devices, with the aim of solving issues such as color compensation or viewing angle enlargement. The materials commonly used for color compensating retardation films are polycarbonates, polyvinyl alcohols, polysulfones, polyether sulfones, amorphous polyolefins and the like, while the materials used for viewing angle enlarging retardation films are those mentioned above as well as polymer liquid crystals, discotic liquid crystals and the like.

A quarter-wave film, which is one type of retardation film, can convert circularly polarized light to linearly polarized light, or linearly polarized light to circularly polarized light. This has been utilized in combination with liquid crystal display devices, particularly reflective liquid crystal display devices having a single polarizing film where the rear electrode, as viewed by an observer, is the reflecting electrode, with anti-reflection films comprising a combination of a polarizing film and a quarter-wave film, or with reflective polarizing films composed of cholesteric liquid crystals or the like that reflect only circularly polarized light only in either the clockwise direction or counter-clockwise direction.

The retardation films used in the aforementioned single polarizing film-type reflective liquid crystal display devices and reflective polarizing films must have a function of converting linearly polarized light to circularly polarized light and circularly polarized light to linearly polarized light, in the visible light region with a measuring wavelength of 400–700 nm, and preferably 400–780 nm. When this is accomplished with a single retardation film, the retardation film ideally has a retardation of λ/4 (nm) (100–175 nm, preferably 195 nm) at a measuring wavelength λ of 400–700 nm, and preferably 400–780 nm.

In order to achieve a smaller retardation with a shorter measuring wavelength as with an ideal quarter-wave film, Japanese Unexamined Patent Publication (Kokai) HEI No. 10-68816 has disclosed a technique of using a quarter-wave film and a half-wave film attached together at an appropriate angle. According to this method, when linear polarized light is incident to the film at an appropriate angle, satisfactory circularly polarized light is obtained in approximately the wavelength range of the visible light region. However, the method of Japanese Unexamined Patent Publication HEI No. 10-68816 requires the quarter-wave film and half-wave film to be attached at an angle which is not perpendicular or parallel to the slow axis in the in-plane direction of each film. Because retardation films made of polymer materials are usually fabricated in a roll-to-roll manner in a stretching process, the slow axis in the in-plane direction of the film lies parallel or perpendicular to the direction in which the film runs, although this depends on the stretching method and the refractive index anisotropy of the film material. Consequently, attachment in such a manner that the retardation axes of the in-plane direction of each film are not at a perpendicular or parallel angle is not preferred from the standpoint of productivity because, when used in a liquid crystal display device, for example, the attachment step is carried out after cutting to the desired size, and there is a reduction in cutting yield while it is essentially impossible to attach the two films continuously in a roll-to-roll manner.

Japanese Patent No. 2609139 discloses a laminated retardation film characterized in that two, three or more different birefringent films made of transparent stretched plastic films are laminated with a combination of different retardation wavelength dependencies due to birefringence, and in the case of a laminate of two different birefringent films, the directions of the maximum in-plane refractive index are in a non-perpendicular relationship by a combination with different signs for the oriented birefringence, or a combination with the same signs for the oriented birefringence is used. The method of Japanese Patent No. 2609139 also allows a certain degree of retardation control, but it requires the use of a plurality of positive or negative films.

In Japanese Examined Patent Publication (Kokai) HEI No. 6-230368 there is also disclosed a retardation film comprising a laminate of stretched films of two or more different polymers, wherein the birefringence is zero at at least one wavelength of visible light. However, since the method of Japanese Unexamined Patent Publication HEI No. 6-230368 also attaches two or more polymer films, extra effort is required for the attachment step in which an optically satisfactory combination film is obtained, just as in the case of Japanese Patent No. 2609139, and therefore the cost is increased for the production of two or more films, while the small thickness of the film is an additional disadvantage.

It is a principal purpose of the present invention to provide a retardation film that compensates for the optical properties of a liquid crystal cell in a liquid crystal display device, to give enhanced image quality.

It is another object of the invention to provide a single retardation film with novel optical properties of its own.

It is yet another object of the invention to provide a novel laminated retardation film or retardation film-integrated polarizing film with improved optical qualities over other retardation films or polarizing films by combination with the aforementioned retardation film.

It is yet another object of the invention to provide a retardation film that is useful for optical apparatuses such as liquid crystal display devices.

DISCLOSURE OF THE INVENTION

The present inventors have studied a wide variety of materials with excellent optical properties, but for the optical uses of retardation films, attention was focused on polymer materials as transparent materials with low light absorption at the measuring wavelength, materials with a glass transition temperature of 100° C. or higher, preferably 120° C. or higher and especially 150° C. or higher, and materials that exhibit favorable molding properties. Polymer materials may be crystalline, amorphous, or liquid crystalline, but amorphous polymers usually allow solvent casting process and are therefore preferred for purposes in which retardation irregularities and the like must be minimized, such as with retardation films. From this standpoint, polycarbonates, polyesters, polyallylates, polyolefins and the like are best as polymer materials, but it is believed that polycarbonates are particularly advantageous from the viewpoint of productivity and increasing freedom of molecular design for copolymerization and the like.

The present inventors also researched the optical properties, and found that a polymer film with excellent properties as a retardation film can be obtained by stretching a polymer film composed of a polymer blend comprising a polymer with positive refractive index anisotropy and a polymer with negative refractive index anisotropy, a copolymer made from a monomer component of a polymer with positive refractive index anisotropy and a monomer component of a polymer with negative refractive index anisotropy, or a combination thereof. The polymers with positive and negative refractive index anisotropy referred to here are defined as follows: a polymer with positive refractive index anisotropy is one wherein the direction of the maximum refractive index in the in-plane direction of the film, i.e. the slow axis, matches the stretching direction when the polymer film is uniaxially stretched, and a polymer with negative refractive index anisotropy is one wherein the slow axis is roughly perpendicular to the stretching direction. Some materials, like polystyrene, have positive refractive index anisotropy or negative refractive index anisotropy depending on the conditions of uniaxial stretching, but here it is defined as the refractive index anisotropy exhibited upon uniaxial stretching from 10° C. below the glass transition temperature to 20° C. above the glass transition temperature, as the usual stretching temperature conditions for fabrication of a commercially available retardation film. These measurements are made by polarized light analysis at a wavelength of 550 nm.

Retardation films characterized by having a range in which the retardation value is positive and a range in which it is negative in a measuring wavelength range of from 400 to 800 nm with a single retardation film are unknown to the prior art. The present inventors have conducted diligent research on materials that give such retardation films, and have completed the present invention upon the discovery that polymers such as certain polycarbonates and blends of polyphenylene oxide and polystyrene are effective to this purpose, and that such retardation films can be fabricated by appropriate selection of the polymers.

It was further found that such retardation films can be used as laminates with other retardation films to control the retardation wavelength dispersion of the other retardation films and thus contribute to enhanced image quality for liquid crystal display devices.

In other words, the present invention is accomplished by a retardation film consisting of a single polymer film, which has a wavelength range in which the retardation value is positive and a wavelength range in which it is negative in a wavelength range of 400–800 nm, which satisfies the following inequality (1) and/or (2), and which has a water absorption of no greater than 1% by mass.

$$|R(400)| \geq 10 \text{ nm} \quad (1)$$

$$|R(700)| \geq 10 \text{ nm} \quad (2)$$

where $|R(400)|$ and $|R(700)|$ represent the retardation values at wavelengths of 400 nm and 700 nm, respectively.

The retardation film of the invention is believed to be based on the following principle. That is, presumably, when the retardation value of the component with positive refractive index anisotropy and the retardation value of the component with negative refractive index anisotropy completely cancel each other out, the retardation value is exactly zero. However, because the polymer has wavelength dispersion in its birefringence, appropriate adjustment of the amount of the component with the positive refractive index anisotropy and the amount of the component with the negative refractive index anisotropy produces a phenomenon such that the retardation value is exactly zero at a wavelength in the measuring wavelength range of 400–800 nm, but the signs of the retardation values in the adjacent ranges are switched, thus giving a positive range and negative range for the retardation value in the measuring wavelength range of 400–800 nm.

BEST MODE FOR CARRYING OUT THE INVENTION (Features of the Retardation Film of the Invention)

The retardation film of the invention is characterized by a single polymer film having a wavelength range in which the retardation value is positive and a wavelength range in which it is negative in a wavelength range of 400–800 nm, and preferably 400–780 nm or 400–700 nm. In the wavelength range of 400–800 nm, it is normally the case that (1) the retardation value is greater with increasing wavelength, being a negative retardation value at a wavelength of 400 nm and a positive retardation value at 800 nm, or (2) the retardation value is smaller with increasing wavelength, being a positive retardation value at 400 nm and a negative retardation value at 800 nm. There is usually one wavelength at which the retardation value is zero within that wavelength range.

The retardation film of the invention is also characterized by satisfying the following inequality (1) and/or (2).

$$|R(400)| \geq 10 \text{ nm} \quad (1)$$

$$|R(700)| \geq 10 \text{ nm} \quad (2)$$

where $|R(400)|$ and $|R(700)|$ represent the retardation values at wavelengths of 400 nm and 700 nm, respectively.

In order to use the retardation film of the invention as a retardation film, it must have one wavelength at which the retardation value is zero in the wavelength range of 400–800 nm, and preferably 400–700 nm, while also having a minimum retardation value at a specific wavelength, i.e. satisfying the aforementioned inequality (1) and/or (2). When the retardation value is constantly zero or near zero in the aforementioned wavelength range it is difficult to provide the function of a retardation film, and thus it is important to satisfy at least one of the above inequalities (1) and (2). The film more preferably satisfies either or both of the following inequalities:

$|R(400)| \geq 20$ nm $|R(700)| \geq 20$ nm and especially:

$|R(400)| \geq 30$ nm $|R(700)| \geq 30$ nm.

However, since practical use as a retardation film is difficult if the water absorption of the polymer film is not 1% by mass or below, the polymer film must satisfy the condition of a water absorption of no greater than 1% by mass, and preferably no greater than 0.5% by mass.

(Polymer Film Material)

The polymer material used for the retardation film of the invention is not particularly restricted and may be any blend or copolymer or their combination that satisfies the aforementioned conditions, although preferred are materials with excellent heat resistance, satisfactory optical performance and suitability to solution film formation, with thermoplastic polymers being especially preferred. For example, one or more types may be appropriately selected from among polyacrylates, polyesters, polycarbonates, polyolefins, polyethers, polysulfin-based copolymers, polysulfone, polyethersulfone and the like. However, in terms of the practicality of the retardation film, the water absorption of the polymer film is limited to no greater than 1% by weight.

A blend polymer must be optically transparent, and therefore it is preferably a compatible blend or one that has roughly equal refractive indexes for each polymer. As suitable examples of specific combinations of blend polymers there may be mentioned combinations of polymers having negative optical anisotropy such as poly(methyl methacrylate) with polymers having positive optical anisotropy such as poly(vinylidene fluoride), poly(ethylene oxide) and poly(vinylidene fluoride-co-trifluoroethylene), combinations of polymers having positive optical anisotropy such as poly(phenylene oxide) with polymers having negative optical anisotropy such as polystyrene, poly(styrene-co-lauroyl maleimide), poly(styrene-co-cyclohexyl maleimide) and poly(styrene-co-phenyl maleimide), a combination of poly(styrene-co-maleic anhydride) having negative optical anisotropy with polycarbonate having positive optical anisotropy, and a combination of poly(acrylonitrile-co-butadiene) having positive optical anisotropy with poly(acrylonitrile-co-styrene) having negative optical anisotropy; however, there is no limitation to these. From the standpoint of transparency, a combination of polystyrene with a poly(phenylene oxide) such as poly(2,6-dimethyl-1,4-phenylene oxide) is particularly preferred. For such combinations, the proportion of the polystyrene preferably constitutes from 61% by mass to 75% by mass of the whole.

Examples of copolymers that may be used include poly(butadiene-co-styrene), poly(ethylene-co-styrene), poly(acrylonitrile-co-butadiene), poly(acrylonitrile-co-butadiene-co-styrene), polycarbonate copolymers, polyester copolymers, polyester carbonate copolymers and polyallylate copolymers. Polycarbonate copolymers, polyester copolymers, polyester carbonate copolymers, polyallylate copolymers and the like that have fluorene skeletons are particularly preferred because the fluorene skeleton segments can provide negative optical anisotropy.

(Polycarbonate films with fluorene skeleton)

Particularly preferred for use as the polymer film for the retardation film of the invention are polycarbonate copolymers produced by reaction of a bisphenol with phosgene or a compound that forms a carbonic acid ester such as diphenyl carbonate, because of their excellent transparency, heat resistance and productivity. Preferred polycarbonate copolymers are copolymers containing structures with fluorene skeletons. The component with the fluorene skeleton is preferably included at 1–99 mole percent.

Suitable polycarbonates for the polymer film of the retardation film of the invention are materials that give a polymer film of a polycarbonate composed of a repeating unit represented by the following formula (I):

where $R_1$–$R_8$ are each independently selected from among hydrogen, halogen atoms and hydrocarbon groups of 1–6 carbon atoms, and X is and a repeating unit represented by the following formula (II):

where $R_9$–$R_{16}$ are each independently selected from among hydrogen, halogen atoms and hydrocarbon groups of 1–22 carbon atoms, and Y is selected from among and —R$_{23}$—,
where R$_{17}$–R$_{19}$, R$_{21}$ and R$_{22}$ in Y are each independently selected from among hydrogen, halogen atoms and hydrocarbon groups of 1–22 carbon atoms, R$_{20}$ and R$_{23}$ are each independently selected from among hydrocarbon groups of 1–20 carbon atoms, and Ar is selected from among aryl groups of 6–10 carbon atoms,
such that the repeating unit represented by formula (I) constitutes 30–90 mole, percent of the total polycarbonate and the repeating unit represented by formula (II) constitutes 70–10 mole percent of the whole.

The material is a polycarbonate copolymer consisting of a repeating unit with a fluorene skeleton represented by formula (I) above and a repeating unit represented by formula (II) above, or a composition containing a polycarbonate comprising a repeating unit with a fluorene skeleton represented by formula (I) above and a polycarbonate comprising a repeating unit represented by formula (II) above (hereunder also referred to as "blend polymer"). In the case of a copolymer, two or more of each of the repeating units represented by formulas (I) and (II) may be combined, and in the case of a composition as well, two or more of the aforementioned repeating units may be used in combination.

In formula (I), R$_1$–R$_8$ are each independently selected from among hydrogen, halogen atoms and hydrocarbon groups of 1–6 carbon atoms. As hydrocarbon groups of 1–6 carbon atoms there may be mentioned alkyl groups such as methyl, ethyl, isopropyl and cyclohexyl, and aryl groups such as phenyl. Of these, hydrogen and methyl are preferred.

In formula (II), R$_9$–R$_{16}$ are each independently selected from among hydrogen, halogen atoms and hydrocarbon groups of 1–22 carbon atoms. As hydrocarbon groups of 1–22 carbon atoms there may be mentioned alkyl groups of 1–9 carbon atoms such as methyl, ethyl, isopropyl and cyclohexyl, and aryl groups such as phenyl, biphenyl and terphenyl. Of these, hydrogen and methyl are preferred.

In Y of formula (II), R$_{17}$–R$_{19}$, R$_{21}$ and R$_{22}$ are each independently selected from among hydrogen, halogen atoms and hydrocarbon groups of 1–22 carbon atoms, which hydrocarbon groups may be the same as those mentioned above. R$_{20}$ and R$_{23}$ are selected from among hydrocarbon groups of 1–20 carbon atoms, which hydrocarbon groups may also be the same as those mentioned above. Ar is selected from among aryl groups of 6–10 carbon atoms such as phenyl and naphthyl.

The content of formula (I), i.e. the copolymer composition ratio in the case of a copolymer or the blend composition ratio in the case of a composition, is 30–90 mole percent of the total polycarbonate. Outside of this range, the film will not have a wavelength range in which the retardation value is positive and a wavelength range in which it is negative for a measuring wavelength of 400–800 nm, using a single retardation film. The content of formula (I) is preferably 35–85 mole percent, and more preferably 40–80 mole percent, of the total polycarbonate.

Here, the molar ratio can be determined by, for example, nuclear magnetic resonance (NMR) with the total bulk of the polycarbonate composing the polymer film, whether in the case of a copolymer or a blend polymer.

The aforementioned copolymers and/or blend polymers can be produced by publicly known processes. For polycarbonates, polycondensation processes and melt polycondensation processes with dihydroxy compounds and phosgene may be suitably used. For blends, compatible blends are preferred but even if they are not totally compatible the refractive indexes of the components can be matched to minimize light scattering between the components and improve the transparency.

Of the aforementioned polycarbonates with fluorene skeletons, the following first, second and third copolymer polycarbonate types are particularly suitable as materials for the polymer film composing the retardation film of the invention.

First polycarbonate type: Polycarbonates composed of a repeating unit represented by the following formula (3):

(3)

where R$_1$–R$_8$ are each independently selected from among hydrogen, halogen atoms and hydrocarbon groups of 1–6 carbon atoms, and X is the following formula (4)

(4)

and a repeating unit represented by the following formula (5):

(5)

where R$_9$–R$_{16}$ are each independently selected from among hydrogen, halogen atoms and hydrocarbon groups of 1–6 carbon atoms, such that the repeating unit represented by formula (3) constitutes 60–90 mole percent of the total polycarbonate and the repeating unit represented by formula (5) constitutes 40–10 mole percent thereof; or

Second polycarbonate type: Polycarbonates composed of a repeating unit represented by formula (3) above and a repeating unit represented by the following formula (6):

(6)

where $R_{17}$–$R_{24}$ are each independently selected from among hydrogen, halogen atoms and hydrocarbon groups of 1–6 carbon atoms,
such that the repeating unit represented by formula (3) constitutes 55–85 mole percent of the total polycarbonate and the repeating unit represented by formula (6) constitutes 45–15 mole percent thereof; or Third polycarbonate type: Polycarbonates composed of a repeating unit represented by formula (3) above and a repeating unit represented by the following formula (7):

(7)

where $R_{25}$–$R_{32}$ are each independently selected from among hydrogen, halogen atoms and hydrocarbon groups of 1–6 carbon atoms,
such that the repeating unit represented by formula (1) constitutes 55–85 mole percent of the total polycarbonate and the repeating unit represented by formula (7) constitutes 45–15 mole percent thereof.

For the first, second and third polycarbonates, in formula (3), $R_1$–$R_8$ are each independently selected from among hydrogen, halogen atoms and hydrocarbon groups of 1–6 carbon atoms. As examples of hydrocarbon groups of 1–6 carbon atoms there may be mentioned methyl, ethyl, propyl, butyl and the like. X is a fluorene ring. Preferably, $R_1$–$R_8$ are all hydrogen, or else either or both $R_1$ and $R_3$ are methyl and either or both $R_6$ and $R_8$ are methyl group.

For the first polycarbonate, in the repeating unit represented by formula (5) above, $R_9$–$R_{16}$ are each independently selected from among hydrogen, halogen atoms and hydrocarbon groups of 1–6 carbon atoms. As hydrocarbon groups of 1–6 carbon atoms there may be mentioned methyl, ethyl, propyl, butyl and the like. In formula (5), $R_9$–$R_{16}$ are preferably hydrogen atoms.

The repeating unit represented by formula (3) constitutes 60–90 mole percent of the total polycarbonate and the repeating unit represented by formula (5) constitutes 40–10 mole percent thereof. Outside of these ranges, the film will not have both positive and negative retardation value ranges at wavelengths from 400–800 nm. Although it will depend on the conditions, when the film is fabricated under ordinary uniaxial stretching conditions such as those employed in the examples described below, the single polycarbonate film can serve as a retardation film with a negative retardation value at a wavelength of 400 nm and a positive retardation value at 800 nm, thus having a wavelength range in which the retardation is positive and a wavelength range in which it is negative within that region, by including the repeating unit represented by formula (3) at 71–79 mole percent of the total polycarbonate and including the repeating unit represented by formula (5) at 29–21 mole percent thereof.

For the second polycarbonate, in the repeating unit represented by formula (6), $R_{17}$–$R_{24}$ are each independently selected from among hydrogen, halogen atoms and hydrocarbon groups of 1–6 carbon atoms. As examples of hydrocarbon groups of 1–6 carbon atoms there may be mentioned methyl, ethyl, propyl, butyl and the like. In formula (6), $R_{17}$–$R_{24}$ are preferably hydrogen atoms.

The repeating unit represented by formula (3) constitutes 55–85 mole percent of the total polycarbonate and the repeating unit represented by formula (6) constitutes 45–15 mole percent thereof. Outside of these ranges, the film will not have both positive and negative retardation value ranges at wavelengths from 400–800 nm. Although it will depend on the conditions, when the film is fabricated under ordinary uniaxial stretching conditions such as those employed in the examples described below, the single polycarbonate film can serve as a retardation film with a negative retardation value at a wavelength of 400 nm and a positive retardation value at 800 nm, thus having a wavelength range in which the retardation is positive and a wavelength range in which it is negative within that region, by including the repeating unit represented by formula (3) at 65–73 mole percent of the total polycarbonate and including the repeating unit represented by formula (6) at 35–27 mole percent thereof.

For the third polycarbonate, in the repeating unit represented by formula (7), $R_{25}$–$R_{32}$ are each independently selected from among hydrogen, halogen atoms and hydrocarbon groups of 1–6 carbon atoms. As examples of hydrocarbon groups of 1–6 carbon atoms there may be mentioned methyl, ethyl, propyl, butyl and the like. In formula (7), $R_{25}$–$R_{32}$ are preferably hydrogen atoms.

The repeating unit represented by formula (3) constitutes 55–85 mole percent of the total polycarbonate and the repeating unit represented by formula (7) constitutes 45–15 mole percent thereof. Outside of these ranges, the film will not have both positive and negative retardation value ranges at wavelengths from 400–800 nm. Although it will depend on the conditions, when the film is fabricated under ordinary uniaxial stretching conditions such as those employed in the examples described below, the single polycarbonate film can serve as a retardation film with a negative retardation value at a wavelength of 400 nm and a positive retardation value at 800 nm, thus having a wavelength range in which the retardation is positive and a wavelength range in which it is negative within that region, by including the repeating unit represented by formula (3) at 66–74 mole percent of the total polycarbonate and including the repeating unit represented by formula (7) at 34–26 mole percent thereof.

In the aforementioned polycarbonates, it is believed that the repeating unit represented by formula (3) corresponds to the component with negative refractive index anisotropy, while the repeating units represented by formulas (5), (6) and (7) correspond to components with positive refractive index anisotropy.

The stretching conditions for the aforementioned polycarbonate are at a temperature of from (Tg–30) to (Tg+50)° C., where Tg is the glass transition temperature in ° C., with a draw ratio from a factor of 1.01 to 4, and preferably a temperature of from (Tg–10) to (Tg+20)° C. with a draw ratio from a factor of 1.1 to 2.5. The retardation wavelength dispersion is thought to be determined by the polycarbonate material and its state of orientation.

The molecular weight of the polycarbonate is determined by a limiting viscosity measurement using methylene chloride as the solvent, and the limiting viscosity is preferably 0.30–2.0 dl/g.

As production methods for the polycarbonate there may be suitably used polycondensation methods and melt polycondensation methods using dihydroxyl compounds and phosgene. When two or more different polycarbonates are used as a blend, a compatible blend is preferred but even if they are not totally compatible the refractive indexes of the components can be matched to minimize light scattering between the components and improve the transparency.

(Blend Film of Polyphenylene Oxide and Polystyrene)

Another material suitable as the polymer film composing the retardation film of the invention is a blend of polyphenylene oxide and polystyrene. This combination can form a compatible blend and produces little haze, and is therefore advantageous as a retardation film. In addition, poly(2,6-dimethyl-1,4-phenylene oxide), which may be mentioned as an example of a polyphenylene oxide, has positive refractive index anisotropy while polystyrene has negative refractive index anisotropy.

The blend ratio of the polyphenylene oxide and polystyrene in this polymer blend film is preferably polystyrene at a content of 61–75% by mass of the whole, and poly(2,6-dimethyl-1,4-phenylene oxide) at 39–25%.by mass.

A retardation film of the invention employing such a polymer blend film can usually be produced by stretching the aforementioned polymer blend film comprising polyphenylene oxide and polystyrene. When the film is fabricated under ordinary uniaxial stretching conditions such those as employed in the examples described below, the blend film alone can serve as a retardation film with a positive retardation value at a wavelength of 400 nm and a negative retardation value at 800 nm, thus having a wavelength range in which the retardation is positive and a wavelength range in which it is negative within that region, at a polystyrene content at 66–67% by mass of the whole and a poly(2,6-dimethyl-1,4-phenylene oxide) content at 34–33% by mass thereof.

The molecular weight of the polystyrene is preferably such that the limiting viscosity is 0.20–2.5 dl/g as determined by limiting viscosity measurement using methylene chloride as the solvent.

The polystyrene may also be stereospecific.

The molecular weight of the polyphenylene oxide used is also preferably such that the limiting viscosity is 0.20–2.5 dl/g as determined by a limiting viscosity measurement using chloroform as the solvent.

In order to obtain a retardation film according to the invention, particularly a film of the aforementioned polymer blend of the polyphenylene oxide and polystyrene, it is preferred to employ solution casting film formation, which is a publicly known method. As organic solvents there may be used publicly known-solvents such as chloroform and dioxolane.

(Production of Retardation Film)

The retardation film of the invention may be produced by using a publicly known melt extrusion process, solvent casting process or the like to form a film of the copolymer or blend polymer material comprising an appropriate combination of components with positive and negative refractive index anisotropy as explained above, and then stretching it. Solvent casting is preferably used from the standpoint of film thickness irregularities and outer appearance. Suitable solvents to be used for solution casting are methylene chloride, dioxolane and the like.

Any publicly known stretching process may be used for stretching, but uniaxial stretching is preferred. The uniaxial stretching may be either longitudinal or lateral stretching. For improved stretchability, the film may also contain publicly known plasticizers including phthalic acid esters such as dimethyl. phthalate, diethyl phthalate and dibutyl phthalate, phosphoric acid esters such as tributyl phosphate, aliphatic dibasic esters, glycerin derivatives, glycol derivatives and the like. During the stretching, the above-mentioned organic solvent used for formation of the film may remain in the film for stretching. The amount of the organic solvent is preferably 1–20% by mass with respect to the solid weight of the polymer.

The retardation film of the invention may be obtained by ordinary uniaxial stretching of the polymer film, but it may also be obtained by publicly known drawing in which the refractive index is increased in the film thickness direction, successive or simultaneous biaxial stretching, or the like.

(Addition of Low Molecular Compound with Optical Anisotropy)

A low molecular compound with optical anisotropy may be added to the retardation film made of a polymer material according to the invention, so long as it has a wavelength range in which the retardation value is positive and a wavelength range in which it is negative, in a wavelength range of 400–800 nm. In such cases, the amount of the low molecular compound is preferably no greater than 20 parts by mass and preferably no greater than 10 parts by mass, to 100 parts by mass of the total retardation film. The purpose of adding a low molecular compound is to achieve delicate control of the retardation wavelength dispersion, but if it exceeds 20 parts by mass it may notably lower the glass transition temperature of the polymer material, or precipitate from the polymer material, or in some cases, it may cause phase separation and produce turbidity, thus making it impossible to maintain transparency. The retardation film of the invention is composed substantially of a polymer material and its properties are utilized to realize a unique wavelength dispersion of retardation; the low molecular compound serves only as an additive to complement the properties of the polymer. Because the retardation film of the invention is made essentially by stretching at near the glass transition temperature of the polymer material, the low molecular compound is preferably one that does not sublimate or gasify at the glass transition temperature of the polymer material to which it is added. The low molecular compound is also preferably one with good compatibility with the polymer material of the retardation film, or if it has poor compatibility, one which has a matching refractive index so that transparency is not lost.

The low molecular compound with optical anisotropy mentioned here is a compound which has an asymmetrical molecular structure for anisotropy of the refractive index of the molecular structure, and it is preferably organic with a molecular weight of no greater than 3000. Whether or not a low molecular compound has optical anisotropy is determined by whether or not the retardation wavelength dispersion of the retardation film changes between when it is added and when it is not added to a retardation film of the invention. That is, a low molecular compound with optical anisotropy as defined here is one which, when added to a retardation film, changes the retardation wavelength dispersion of the retardation film. As mentioned above, the molecular weight is preferably not over 3000, since this will tend to result in phase separation with the polymer material, which is the primary material of the retardation film.

While there are no particular restrictions on such low molecular compounds, there may be mentioned as examples, liquid crystals, polymerizable liquid crystals, saccharose acetate, xylene, toluene, biphenyl, terphenyl, dichromatic colorants, colorants, dyes, pigments, near infrared absorbing colorants, oligomers, dialkyl phthalates, and the like.

The method of addition may be any publicly known method commonly used for addition of polymer material plasticizers or the like. The aforementioned low molecular compound may also serve as a plasticizer.

When a polycarbonate such as mentioned above is used as the polymer film of the invention, addition of the low molecular compound with refractive index anisotropy may result in a slight shift in the preferred copolymerization ratio (molar ratio) of the polycarbonate.

(Other Additives)

There may also be added to the retardation film of the invention various ultraviolet absorbers such as phenylsalicylic acid, 2-hydroxybenzophenone and triphenylphosphate, or bluing agents for adjustment of the color, antioxidants, and the like.

(Film Thickness)

The thickness of the retardation film is preferably from 1 $\mu$m to 400 $\mu$m. It is more preferably 10–200 $\mu$m, and even more preferably 30–150 $\mu$m.

(Modification of Other Optical Properties of the Film)

One of the properties sometimes required for a retardation film used for a liquid crystal display device or reflective polarizing film is the requirement that the retardation not change even when the angle of incidence to the retardation film changes from normal incidence to oblique incidence. In such cases, the value of $N_z(n_x-n_z)/(n_x-n_y)$, expressed in terms of the three-dimensional refractive index $n_x$, $n_y$ and $n_z$, is preferably between 0.3 and 1.5. In particular, when $N_z=0.5$, there is virtually no change in the retardation even when the angle of incidence to the retardation film changes from normal incidence to oblique incidence. The three-dimensional refractive index is obtained by measuring the incident angle dependence of retardation, assuming the retardation film as a refractive index spheroid. The measuring wavelength is established at 400–800 nm, and preferably 400–780 nm, but it may also be established at 400–700 nm.

By appropriate use of publicly known stretching techniques and film forming techniques for the polymer film of the invention, it is possible to obtain retardation films with a variety of optical properties, such as $n_x \approx n_y > n_z$, $n_x \approx n_y < n_z$, $n_x > n_y > n_z$, $n_x > n_z > n_y$, $n_x > n_y \approx n_z$, etc. Films may also be fabricated with these optical axes at inclinations. As explained above, the retardation wavelength dispersion is controlled by the state of polymer orientation as represented by the three-dimensional refractive index, etc. and the chemical structure of the polymer, but by combining control of the three-dimensional refractive index and the unique retardation wavelength dispersion of the film of the present invention, it is possible to obtain viewing angle enlarging and color compensating films that are suited for given purposes and can contribute to enhanced image quality of liquid crystal display devices.

(Methods of Using the Film)

The retardation film of the invention may be used instead of glass plates sandwiching a liquid crystal layer of the aforementioned liquid crystal display device, to perform the roles of both a base film and a retardation film.

The retardation film of the invention can be attached to a polarizing film via a tacky layer or adhesive layer to form a circularly polarizing film, or a material may be coated onto the retardation film to improve the moist heat durability or to improve the solvent resistance.

(Laminated Retardation Film)

The retardation film of the invention can also be used as a laminated layer with another retardation film having a positive or negative retardation value in the measuring wavelength range of 400–800 nm. Here, a retardation film with a positive retardation value is one whose direction of stretching is the delay axis which is the direction of the maximum in-plane refractive index in a measuring wavelength range of 400–800 nm, when uniaxially stretched at a stretching temperature of from (Tg−30) to (Tg+50)° C., preferably (Tg±20)° C. and more preferably from (Tg−10)° C. to (Tg+20)° C. of the polymer material of the retardation film, while a retardation film with a negative retardation value is one whose direction of stretching is perpendicular to the delay axis in a measuring wavelength range of 400–800 nm, when stretched in the same manner. The retardation film of the invention may be used as a (laminated) retardation film by lamination with such another retardation film having a positive or negative retardation value, to allow control of the retardation wavelength dispersion of the other retardation film and thus contribute to enhanced image quality of a liquid crystal display device or the like. This is one of the special effects of the invention.

The direction of the lamination is generally set as appropriate depending on the purpose of use, and for example, among the retardation films of the invention, those retardation films with wavelength dispersion properties that are negative at the short wavelength end and positive at the long wavelength end may be laminated with another retardation film having a positive retardation value with their stretching axes mutually parallel, to allow control of the retardation dispersion properties of the other retardation film. Alternatively, among the retardation films of the invention, those retardation films with wavelength dispersion properties that are positive at the short wavelength end and negative at the long wavelength end may be laminated with another retardation film having a positive retardation value with their stretching axes mutually perpendicular, to allow control of the retardation dispersion properties of the other retardation film. As a result, it is possible to improve the other retardation film to give it the desired retardation properties, for example, a small retardation value at the short wavelength end and a large retardation value at the long wavelength end, or to fabricate a wide-band λ/4 film having a retardation value which is roughly a quarter wavelength for wavelengths λ of 400–800 nm, for example, which can be suitably used especially for polarizing film-integrated reflective liquid crystal display devices. Here, a small retardation value at the short wavelength end and a large retardation value at the long wavelength end means that the retardation value at a wavelength of 550 nm is larger than that at a wavelength of 450 nm.

For fabrication of a wide-band λ/4 film by a combination such as described above, the other retardation film with a positive retardation value may be another retardation film having retardation wavelength dispersion properties such that the retardation value is smaller with shorter wavelengths and the retardation value is larger with longer wavelengths.

Conversely, among the retardation films of the invention, a retardation film which is positive at the short wavelength end and negative at the long wavelength end may be laminated with another retardation film whose retardation value is positive, with their stretching axes mutually parallel, to allow control of the retardation dispersion properties of the other retardation film. As a result, it is possible to improve the other retardation film to give it the desired retardation properties, for example, a large retardation value at the short wavelength end and a small retardation value at the long wavelength end, to provide a retardation film with a large birefringence wavelength dispersion that can be suitably used, for example, in a high-speed response super twisted nematic liquid crystal display device with a large birefringence wavelength dispersion in the liquid crystal cells.

These will be explained in further detail by means of Examples, but it is possible to control the wavelength dispersion property of the retardation by laminating the retardation films in this manner.

In such cases, since both are laminated with their stretching axes parallel, if both of the films have been fabricated by longitudinal uniaxial stretching, for example, it is possible to carry out the attachment step in a roll-to-roll manner, which is highly advantageous from the standpoint of productivity. When fabricating a wide-band λ/4 film with such a combination, a film with a smaller retardation at shorter wavelengths may be used for retardation wavelength dispersion of a retardation film with a positive retardation value, for example.

These will be explained in further detail by means of Examples, but it is possible to control the wavelength dispersion property of the retardation by laminating the retardation films in this manner.

Incidentally, while some control of the retardation is possible even by the method of Japanese Patent Publication No. 2609139, it requires a plurality of positive or negative films. On the other hand, a retardation film according to the invention which has retardation wavelength dispersion such that the retardation is negative at the short wavelength end and positive at the long wavelength end can be laminated with another single retardation film with a certain wavelength dispersion, so that, when it is not desired to change the retardation value of the other retardation film at a measuring wavelength of 550 nm, for example, the retardation wavelength dispersion can be controlled very delicately for retardation which is smaller at the shorter wavelength end than that wavelength and larger at the longer wavelength end. A retardation film characterized by having a range in which the retardation value is positive and a range in which it is negative, at measuring wavelengths of 400–800 nm according to the invention, may not only be used in combination with other retardation films in this manner but, by itself, it can also compensate for optical properties of liquid crystal cells of liquid crystal display devices, and enhance image quality.

The retardation film of the invention can also be used in combination with a polarizing film or the like in the optical elements not only of liquid crystal display devices but also of other display devices, such as organic electroluminescence displays (also referred to as OLEDs), plasma displays, field emission displays, inorganic electroluminescence displays and the other light emitting elements.

The material for a retardation film with a positive retardation value in the total wavelength range of 400–800 nm is preferably a polymer material, and examples of preferred ones include polycarbonates, polyesters, polyallylates, polyolefins, polyethers, polyphenylene oxides, polysulfones, polyethersulfones, polyvinyl alcohols, amorphous polyolefins, liquid crystal polymers, polymerizable liquid crystals which have been oriented and hardened, etc. The material for a negative retardation film is preferably polystyrene, polycarbonates with fluorene skeletons, triacetyl cellulose, etc. Polycarbonates are particularly preferred from the standpoint of transparency and high heat resistance and, as examples of bisphenol components composing such polycarbonates, there may be mentioned bisphenol A, biscresol, bisphenols with fluorene skeletons, bisphenols with isophorone skeletons or the like, bisphenols with cyclohexane skeletons, and the like. Copolymers of two or more of these may also be used. More preferred are homopolymers with bisphenol A as the bisphenol component.

Optical compensating films composed of discotic liquid crystals, polymer liquid crystals with a twisted structure, etc. may also be laminated with the retardation film of the invention.

When the retardation film of the invention is laminated with another retardation film and used as a quarter-wave film, it is preferred for the retardation value to be ¼ wavelength at a measuring wavelength of 550 nm, and more specifically, the retardation value is preferably from 110 nm to 160 nm. This value will be set depending on the purpose of use. This quarter-wave film may be used as an element that converts circularly polarized light to linearly polarized light or linearly polarized light to circularly polarized light in a reflective liquid crystal display device using only one polarizing film or in a reflective liquid crystal display device comprising a combination of guest-host crystals and a quarter-wave film, or as an element that converts circularly polarized light to linearly polarized light, in combination with an element that only reflects circularly polarized light on one side which is used as a brightness-enhancing film of a backlight-equipped transmission liquid crystal display device.

(Retardation Film-integrated Polarizing Film)

The retardation film of the invention can realize effects that are difficult to achieve with combinations of ordinary retardation films, by preparing a retardation film-integrated polarizing film which is a combination of, for example, an ordinary polarizing film comprising a dichromic absorbing substance such as iodine or a dye, or a reflective polarizing film that reflects or diffuses only polarized light on one side. For example, a retardation film of the invention having a retardation of approximately zero at a measuring wavelength of 550 nm, a negative retardation at shorter wavelengths and a positive retardation at longer wavelengths may be used in combination with a dichromic absorbing polarizing film to avoid changing the linearly polarized state at a measuring wavelength of 550 nm while changing only the polarized state at other wavelengths, thereby allowing a change of the wavelength dispersion of the outgoing polarization state of the polarizing film.

Also, while triacetyl cellulose films have conventionally been used as protective films for polarizing films containing iodine or dichromic pigments added to polyvinyl alcohol, a retardation film of the invention may be used in place of such a protective film. For improved adhesion with the polarizing film in such a case, various types of coating agents may be applied. Suitable coating agents that may be used for this purpose are urethane-based resins. Adhesives and pressure-sensitive adhesives preferably are transparent with a refractive index matching that of the films in order to minimize interfacial reflection, and they may be preferably selected in consideration of heat shrinkage of the film.

This type of retardation film-integrated polarizing film can be used, for example, as an-anti-reflection film for an emission device or touch panel, in addition to a liquid crystal display device.

(Liquid Crystal Display Device)

By using the aforementioned retardation film or retardation film-integrated polarizing film in a liquid crystal display device, it is possible to realize enhanced image quality. A retardation film of the invention may also be used in place of a glass plate. In that case, an effect is provided whereby it is possible to reduce the number of optical members used in the liquid crystal display device while also lowering the thickness, which is a drawback of glass plates, so that it becomes possible to prevent image fading due to parallax caused by the thickness of the glass which constitutes a problem particularly for reflective liquid crystal display devices, while also compensating for the tendency of the glass plate to break.

(Schematic Diagrams of the Embodiments)

Figure 1:
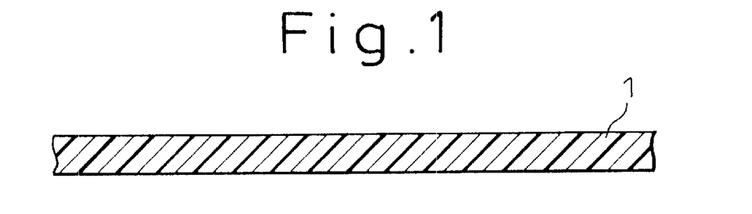
FIG. 1 shows a retardation film according to the invention.
Figure 2:
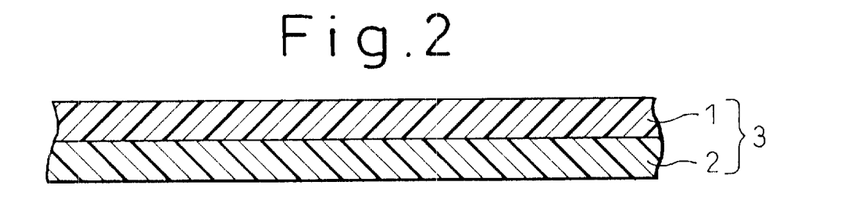
FIG. 2 shows a laminated retardation film employing a retardation film according to the invention.
Figure 3:
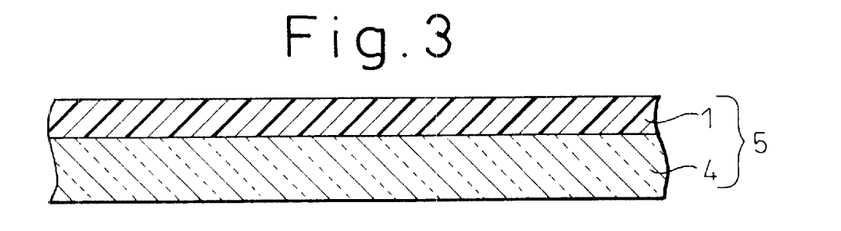
FIG. 3 shows a retardation film-integrated polarizing film employing a retardation film according to the invention.

The retardation film of the invention shown in FIG. 1 may be used to make a construction such as shown in FIG. 2, wherein it is laminated with another retardation film 2 to construct a laminated retardation film 3, or wherein it is laminated with a polarizing film 4 to construct a retardation film-integrated polarizing film 5. If necessary, a publicly known pressure-sensitive adhesive may also be used for the lamination.

Figure 4:
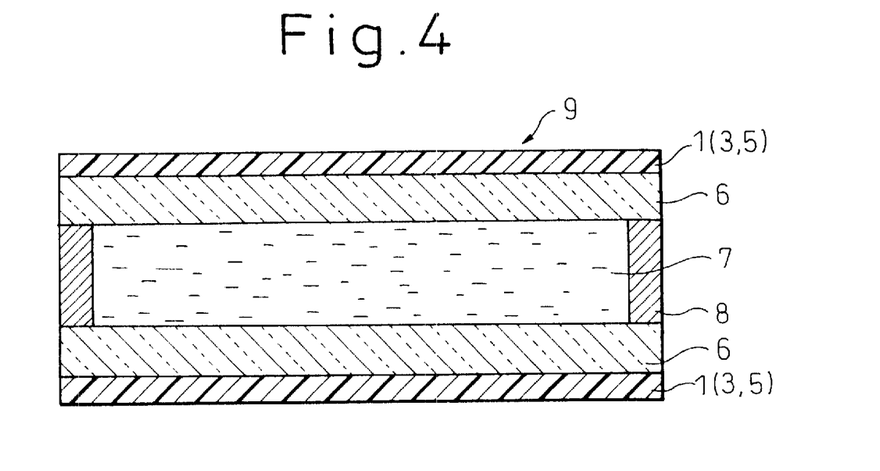
FIG. 4 shows a liquid crystal display device employing a retardation film-integrated polarizing film according to the invention.

This type of retardation film of the invention may be suitably incorporated into a liquid crystal display device 9 as shown in FIG. 4, as the retardation film 1 alone or as a laminated retardation film 3 or a retardation film-integrated polarizing film 5. In FIG. 4, 6 is an electrode-attached glass substrate, 7 is a liquid crystal layer and 8 is a seal.

EXAMPLES

The present invention will now be explained in greater detail by way of the following examples, which are not intended to restrict the invention.

(Evaluation Methods)

The property values of the materials described throughout the present specification were obtained by the following evaluation methods.

(1) Measurement of Retardation Values (Δn·d)

The retardation value which is the product of the birefringence Δn and the film thickness d was measured with the spectral ellipsometer "M150" by Jasco, Inc.

(2) Measurement of Proton NMR

The copolymer composition ratio of polycarbonate was analyzed by proton NMR measurement. The measuring solvent used was denterated benzene, and the apparatus used was a "JNM-alpha600" by Nippon Denshi.

(3) Measurement of Film Thickness

Measurement was made with an electronic micrometer (measuring instrument) by Anritsu Corp.

(4) Measurement of Water Absorption

Measurement was made according to "Plastics Water Absorption and Hot Water Absorption Testing Method" of JIS K 7209, except that the film thickness of the dried film was 130±50 μm. The test piece was a 50 mm square piece, the water temperature was 25° C., and the weight change was measured after immersing the sample in water for 24 hours. The units are given as percentages.

(5) Polycarbonate Monomers

The structures of the polycarbonate monomers used in the following examples and comparative examples were as follows.

[A]

[B]

[C]

[D]

Example 1

A sodium hydroxide aqueous solution and ion-exchange water were charged into a reaction vessel equipped with a stirrer, thermometer and reflux condenser, and then monomers [A] and [D] having the structures shown above were dissolved in the molar ratios given in Table 1 and a small amount of hydrosulfite was added. After then adding methylene chloride, phosgene was blown in at 20° C. for about 60 minutes. After adding p-tert-butylphenol for emulsification, triethylamitine was added and the mixture was stirred at 30° C. for about 3 hours to complete the reaction. Upon completion of the reaction, the organic phase was separated off and the methylene chloride was evaporated to obtain a polycarbonate copolymer. The compositional ratio of the obtained copolymer was roughly the same as the monomer charging ratio.

Figure 5:
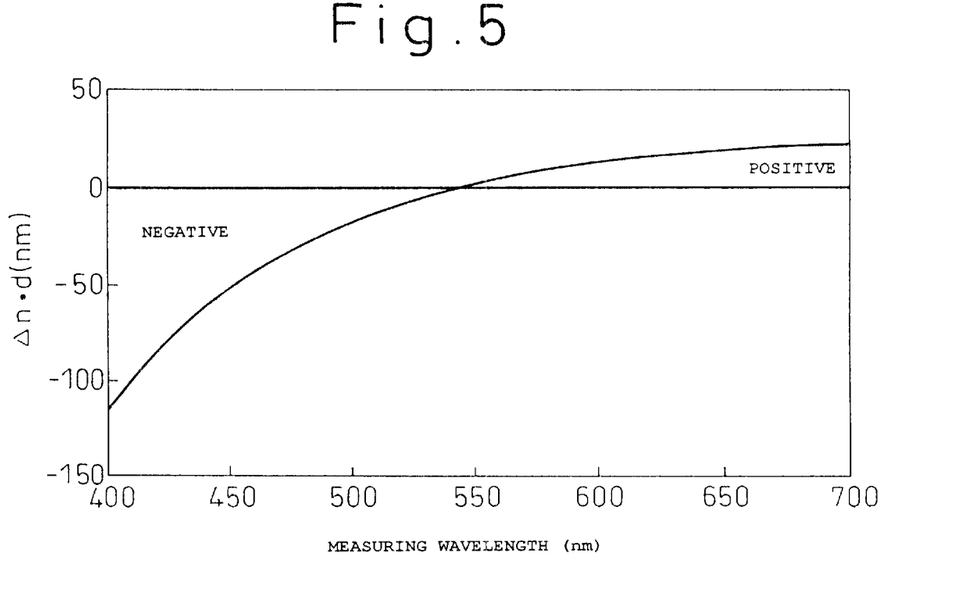
FIG. 5 shows retardation wavelength dispersion for the retardation film of Example 1.

The copolymer was dissolved in methylene chloride to prepare a doping solution with a solid content of 20 mass %. A cast film with a thickness of 120 μm was formed from this doping solution, and was subjected to uniaxial stretching to a factor of 1.3 at a temperature of 240° C., to fabricate a retardation film with the film thickness, retardation values, retardation wavelength dispersion values and water absorption as listed in Table 1. FIG. 5. shows the retardation wavelength dispersion properties at measuring wavelengths of 400–700 nm. Table 1 and FIG. 5 confirm that the retardation wavelength dispersion values at measuring wavelengths of 400–700 nm are zero at near 550 nm, negative at the short wavelength end and positive at the long wavelength end.

This film was attached via an adhesive to a commercially available uniaxially stretched polarizing film comprising polyvinyl alcohol doped with iodine, in such a manner that their respective stretching axes were arranged at 45 degree (45°), while another separate polarizing film was used with the retardation film between both polarizing films, the orientation of the polarizing films being set at a cross Nicol configuration. In observing the color tone of the polarizing film, it was possible to view the change in color tone in comparison to when the retardation film was absent. In other words, it was demonstrated that combination of a polarizing films with this retardation film can delicately alter the color tone of the polarizing films.

Example 2

A polycarbonate copolymer was obtained by the same method as Example 1, except that the monomers listed in Table 1 were used. The compositional ratio of the resulting copolymer was roughly the same as the monomer charging ratio. A retardation film was formed in the same manner as Example 1. Table 1 confirms that at measuring wavelengths of 400–700 nm, the retardation wavelength dispersion value is negative at the short wavelength end and positive at the long wavelength end.

Example 3

A polycarbonate copolymer was obtained by the same method as Example 1, except that the monomers listed in Table 1 were used. The compositional ratio of the resulting copolymer was roughly the same as the monomer charging ratio. A retardation film was formed in the same manner as Example 1. Table 1 confirms that at measuring wavelengths of 400–700 nm, the retardation wavelength dispersion value is negative at the short wavelength end and positive at the long wavelength end.

Reference Example 1

A polycarbonate copolymer was obtained by the same method as Example 1, except that the monomers listed in Table 1 were used. This was used to fabricate a retardation film in the same manner as Example 1 except that the stretching conditions were 160° C. and a factor of 1.1. The retardation film had positive refractive index anisotropy and had the retardation dispersion values shown in Table 1.

Example 4

Figure 6:
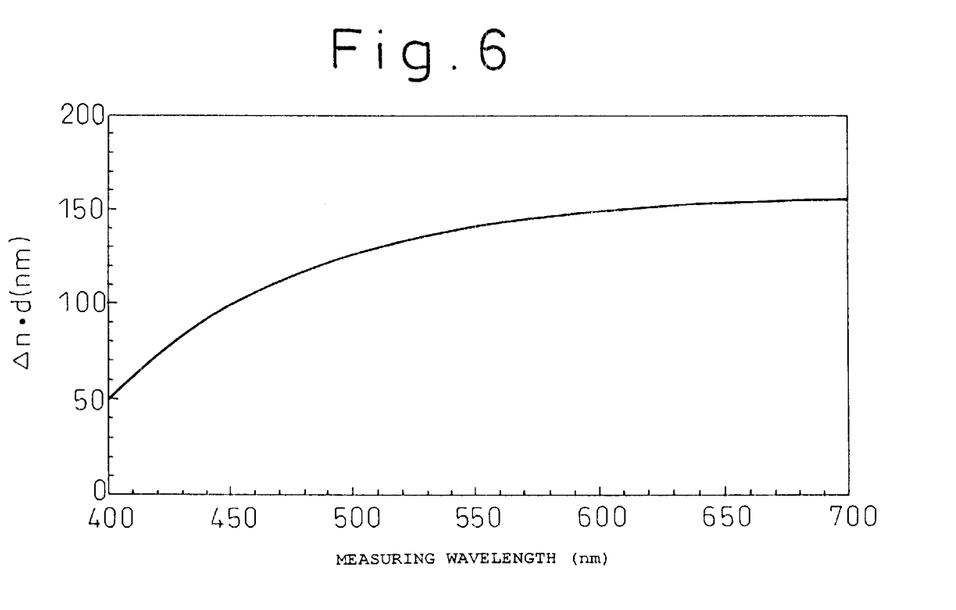
FIG. 6 shows retardation wavelength dispersion for the laminated retardation film of Example 4.

The retardation film fabricated in Example 1 and the retardation film of Reference Example 1 were attached using an adhesive in such a manner that their stretching axes were parallel. The retardation wavelength dispersion properties of the laminated retardation film are shown in Table 2 and FIG. 6. The laminated retardation film had a larger retardation with longer wavelengths, indicating that the retardation film had retardation of approximately a quarter wavelength in a wide range.

This laminated retardation film and a commercially available polarizing film ("LLC2-9218", trade name of Sanritsu, KK.) were attached via an adhesive in such a manner that the absorption axis of the polarizing film and the delay axis of the retardation film were arranged at 45°. After removing the touch panel, polarizing film and retardation film on the observer side of the liquid crystal layer of a reflective color liquid crystal display device of a portable data terminal ("Zaurus Color Pocket MI-310", trade name of Sharp Corp.), the retardation film-integrated polarizing film was attached via an adhesive at an appropriate angle. The portable data terminal was activated, and a display device was thus obtained with excellent image quality exhibiting no coloration of the black state.

Reference Example 2

A polycarbonate copolymer was obtained by the same method as Example 1, except that the monomers listed in Table 1 were used. This was used to fabricate a retardation film in the same manner as Example 1 except that the stretching conditions were 161° C. and a factor of 1.2. The retardation film had positive refractive index anisotropy and had the retardation dispersion values shown in Table 1.

Example 5

The monomers listed in Table 1 were used to fabricate a polycarbonate copolymer in the same manner as Example 1. The sample with a ratio of monomers [A] and [D] of 26:74 (mol %) had negative retardation at the short wavelength end and positive retardation at the long wavelength end. The retardation dispersion values are shown in Table 1.

Example 6

The retardation film of Example 5 and the retardation film of Reference Example 2 were attached using an adhesive in such a manner that their stretching axes were parallel. The retardation wavelength dispersion properties of the laminated retardation film are shown in Table 2. The laminated retardation film had a smaller retardation with longer wavelengths. The laminated retardation film had a large $\Delta n \cdot d$ (450)/$\Delta n \cdot d$(550) value of 1.18 and a large liquid crystal cell retardation wavelength dispersion, thus exhibiting satisfactory properties for a high-speed response super twisted nematic liquid crystal display device.

Example 7

A methylene chloride dope solution with a solid concentration of 20% by mass was prepared using 1.5 parts by mass of saccharose octaacetate to 98.5 parts by mass of the polycarbonate copolymerized in Example 1. A cast film with a thickness of 120 μm was fabricated from the dope solution, and it was uniaxially stretched to a draw factor of 1.2 at a temperature of 240° C. to make a retardation film having the retardation wavelength dispersion values shown in Table 1. Table 1 confirms that at measuring wavelengths of 400–800 nm, the retardation wavelength dispersion. value is negative at the shorter wavelength end and positive at the longer wavelength end, but a different retardation wavelength dispersion from Example 1 was obtained.

TABLE 1

|  | Example 1 | Example 2 | Example 3 | Ref. Ex. 1 | Ref. Ex. 2 | Example 5 | Example 7 |
|---|---|---|---|---|---|---|---|
| Monomer 1 structure (charging amount in mole percent) | [A] (26) | [B] (30) | [C] (30) | [A] (100) | [A] (100) | [A] (26) | [A] (26) |
| Monomer 2 structure (charging amount in mole percent) | [D] (74) | [D] (70) | [D] (70) |  |  | [D] (74) | [D] (74) |
| Film thickness (μm) | 80 | 80 | 75 | 80 | 80 | 80 | 80 |
| R (400) (nm) | −90 | −93 | −33 | 174 | 423 | −70 | −67 |
| R (700) (nm) | 20 | 8 | 7 | 139 | 345 | 17 | 8 |
| Δn · d (450) (nm) | −44 | −35 | −19 | 153 | 380 | −33 | −33 |
| Δn · d (550) (nm) | 0 | 5 | −3 | 140 | 350 | 0 | −4 |
| Δn · d (650) (nm) | 16 | 10 | 5 | 139 | 345 | 14 | 6 |
| Water absorption (mass%) | 0.2 | 0.2 | 0.2 | 0.2 | 0.2 | 0.2 | 0.2 |

TABLE 2

|  | Example 4 | Example 6 |
|---|---|---|
| Δn · d (450) (nm) | 109 | 413 |
| Δn · d (550) (nm) | 140 | 350 |
| Δn · d (650) (nm) | 155 | 331 |
| Δn · d (450) / Δn · d (550) | 0.78 | 1.18 |
| Δn · d (650) / Δn · d (550) | 1.11 | 0.95 |

Comparative Examples 1–6

All polycarbonate polymers were obtained in the same manner as Example 1, except that the monomers listed in Table 3 were used. These were used to fabricate retardation films in the same manner as Example 1. As shown in Table 3, at measuring wavelengths of 400–800 nm, none of the samples had both positive and negative regions for the retardation values.

TABLE 3

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Monomer 1 structure (charging amount in mole percent) | [A] (70) | [A] (5) | [B] (70) | [B] (5) | [C] (70) | [C] (5) |

TABLE 3-continued

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Monomer 2 structure (charging amount in mole percent) | [D] (30) | [D] (95) | [D] (30) | [D] (95) | [D] (30) | [D] (95) |
| Δn · d (450) (nm) | 135 | −88 | 134 | −75 | 201 | −31 |
| Δn · d (550) (nm) | 128 | −73 | 129 | −64 | 191 | −27 |
| Δn · d (650) (nm) | 126 | −67 | 126 | −60 | 188 | −25 |

Example 8

Polystyrene (Catalog No. 18242-7, product of Aldrich Chemical Co.) and poly(2,6-dimethyl-1,4-phenylene oxide) (Catalog No. 18178-1, product of Aldrich Chemical Co.) were dissolved in chloroform at respective proportions of 66.5% by mass and 33.5% by mass, to prepare a dope solution with a solid concentration of 18% by mass. A cast film was fabricated from the dope solution and uniaxially stretched to a factor of 2 at a temperature of 130° C.

Figure 7:
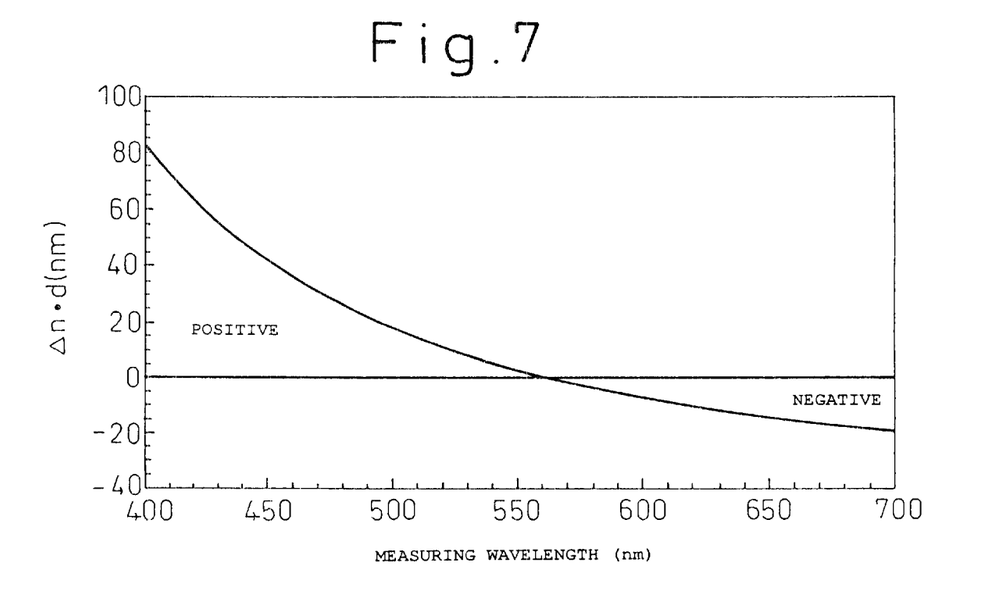
FIGS. 7 to 9 show retardation wavelength dispersions for the retardation films of Examples 8 to 10.

The thickness of the film was 90 μm, the retardation value at a measuring wavelength of 400 nm was 82 nm, the retardation value at a wavelength of 700 nm was −18 nm, and the water absorption was 0.3% by mass. Table 4 shows the retardation values at 3 wavelengths and the values for the retardation wavelength dispersion properties at wavelengths of 450 and 650 nm with respect to the retardation value R(550 nm), or R(450)/R(550), R(650)/R(550). FIG. 7 is a graph showing the retardation wavelength dispersion properties. This film had positive retardation with a measuring wavelength at the shorter wavelength end and a negative retardation at the longer wavelength end.

Example 9

Figure 8:
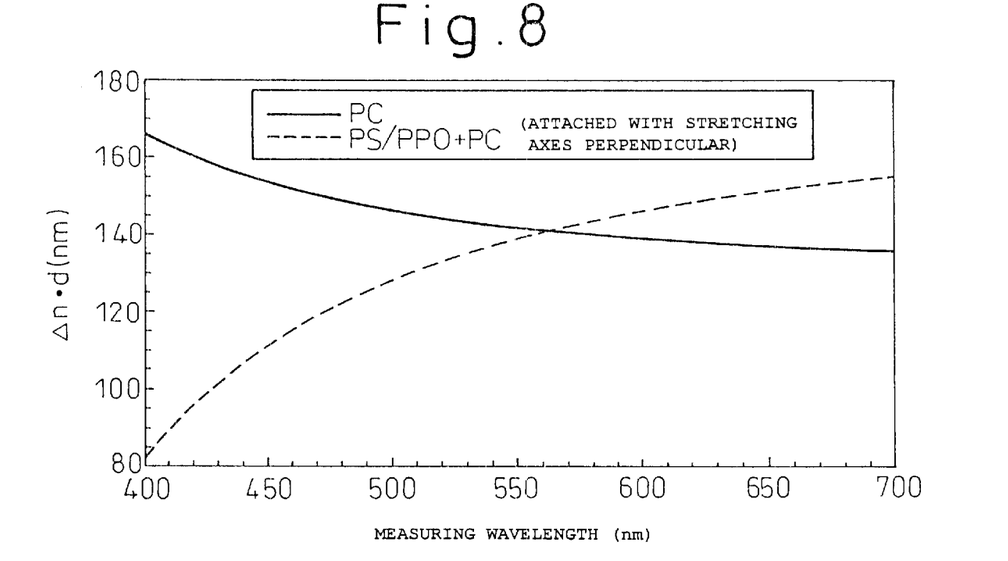

A polycarbonate with a viscosity-average molecular weight of 38,000 ("Panlite C1400 Grade", trade name of Teijin Chemical Co., Ltd.) obtained by polymerization of bisphenol A and phosgene was dissolved in methylene chloride to prepare a dope solution with a solid concentration of 20% by mass, and this dope was used for solution casting to fabricate a polycarbonate film with a thickness of 100 μm. The film was subjected to longitudinal uniaxial stretching to a factor of 1.1 at 160° C. to obtain a retardation plate with a positive retardation value. The properties are shown in Table 4 and FIG. 8. This retardation plate was attached to the retardation plate of Example 8 via an adhesive in such a manner that their stretching directions were perpendicular. The retardation wavelength dispersion properties of the laminated retardation plate are shown in Table 4 and FIG. 8. The laminated retardation plate had a delay axis in the stretching direction of the polycarbonate, and as shown in FIG. 8, the retardation was smaller with shorter measuring wavelength and it functioned as a quarter waveplate in a considerably wide range.

This retardation plate was attached to a commercially available polarizing plate in such a manner that the polarizing axis thereof was arranged at 45° with the delay axis of the retardation plate, and was then substituted for the polarizing plate and retardation plate on the observer side of a reflective color liquid crystal display device of a commercially available portable data terminal, "Zaurus Color Pocket MI-310™". The result was a liquid crystal display device with excellent image quality.

Example 10

Figure 9:
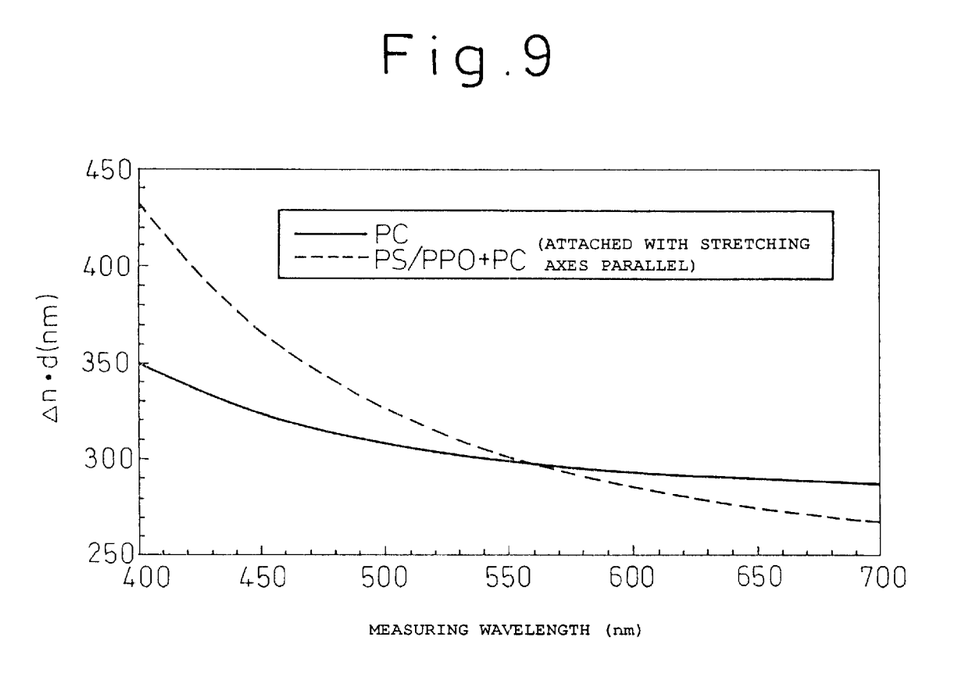

A polycarbonate with a viscosity-average molecular weight of 38,000 ("Panlite C1400 Grade", trade name of Teijin Chemical Co., Ltd.) obtained by polymerization of bisphenol A and phosgene was dissolved in methylene chloride to prepare a dope solution with a solid concentration of 20% by mass, and this dope was used for solution casting to fabricate a polycarbonate film with a thickness of 100 μm. The film was subjected to longitudinal uniaxial stretching to a factor of 1.2 at 162° C. to obtain a retardation plate with a positive retardation value. The properties are shown in Table 4 and FIG. 9. This retardation plate was attached to the retardation plate of Example 8 via an adhesive in such a manner that their stretching directions matched. The retardation wavelength dispersion properties of the laminated retardation plate are shown in Table 4 and FIG. 9. The laminated retardation plate had a delay axis in the stretching direction of the polycarbonate, and while there was virtually no change in the retardation at a measuring wavelength of 550 nm, with shorter wavelengths the retardation was larger than the polycarbonate retardation plate alone.

Comparative Example 7

The polystyrene and poly(2,6-dimethyl-1,4-phenylene oxide) used in Example 8 were dissolved in chloroform to respective proportions of 80% by mass and 20% by mass, to prepare a dope solution with a solid concentration of 18% by mass. A cast film was formed from this doping solution, and was subjected to uniaxial stretching to a factor of 1.7 at a temperature of 130° C.

The retardation wavelength dispersion properties are shown in Table 4. The film was a negative retardation plate.

Comparative Example 8

The polystyrene and poly(2,6-dimethyl-1,4-phenylene oxide) used in Example 8 were dissolved in chloroform to respective proportions of 60% by mass and 40% by mass, to prepare a dope solution with a solid concentration of 18% by mass. A cast film was formed from this doping solution, and was subjected to uniaxial stretching to a factor of 1.3 at a temperature of 130° C.

The retardation wavelength dispersion properties are shown in Table 4. The film was a positive retardation plate.

TABLE 4

|  | Example 8 | Example 9 | | Example 10 | | Comp. Ex. 7 | Comp. Ex. 8 |
|---|---|---|---|---|---|---|---|
| Retardation plate material | PS/PPO | PC | PC + PS/PPO | PC | PC + PS/PPO | PS/PPO | PS/PPO |
| Stretching axis attachment angle | — | — | perpendicular | — | parallel | — | — |
| Δn · d (450) (nm) | 41 | 153 | 112 | 323 | 364 | −43 | 51 |
| Δn · d (550) (nm) | 2 | 142 | 138 | 300 | 302 | −43 | 44 |
| Δn · d (650) (nm) | −14 | 138 | 155 | 290 | 276 | −42 | 41 |

TABLE 4-continued

|  | Example 8 | Example 9 | Example 10 | Comp. Ex. 7 | Comp. Ex. 8 |
|---|---|---|---|---|---|
| R(450)/R(550) | 20.5 | 1.08 | 0.81 | 1.08 | 1.21 | 1.16 |
| R(650)/R(550) | −7 | 0.97 | 1.12 | 0.97 | 0.91 | 0.98 | 0.93 |

PS/PPO: polystyrene/poly(2, 6-dimethyl-1,4-phenylene oxide) blend
PC: polycarbonate

Industrial Applicability

As explained above, the retardation film of the invention has a region in which the retardation value is positive and a region in which it is negative at measuring wavelengths of from 400–800 nm, and can therefore be used alone or in combination with another retardation film for adjustment to a suitable retardation value to provide an excellent viewing angle enlarging film, color compensating film, polarizing film, circularly polarizing film, elliptical polarizing film or liquid crystal display device, as desired. By using a polymer film comprising a polycarbonate copolymer and/or blend with a fluorene skeleton as the retardation film material, it is possible to obtain a retardation film with particularly excellent properties.

What is claimed is:

1. A retardation film consisting of a single polymer film, which has a wavelength range in which the retardation value is positive and a wavelength range in which it is negative in a wavelength range of 400–800 nm, which satisfies the following inequality (1) and/or (2), and which has a water absorption of no greater than 1% by mass, $$|R(400)| \geq 10 \text{ nm} \quad (1)$$

$$|R(700)| \geq 10 \text{ nm} \quad (2)$$

where $|R(400)|$ and $|R(700)|$ represent the retardation values at wavelengths of 400 nm and 700 nm, respectively.

2. A retardation film according to claim 1, wherein the retardation value is negative at a wavelength of 400 nm and the retardation value is positive at 800 nm.

3. A retardation film according to claim 1 or 2, wherein said polymer film is a polycarbonate film.

4. A retardation film according to claim 3, wherein said polymer film is a polycarbonate film with a fluorene skeleton.

5. A retardation film according to claim 4, wherein the polymer film comprises a polycarbonate composed of a repeating unit represented by the following formula (3):

(3)

where $R_1$–$R_8$ are each independently selected from among hydrogen, halogen atoms and hydrocarbon groups of 1–6 carbon atoms, and X is the following formula (4)

(4)

and a repeating unit represented by the following formula (5):

(5)

where $R_9$–$R_{16}$ are each independently selected from among hydrogen, halogen atoms and hydrocarbon groups of 1–6 carbon atoms, and the repeating unit represented by formula (3) constitutes 60–90 mole percent of the total polycarbonate and the repeating unit represented by formula (5) constitutes 40–10 mole percent thereof.

6. A retardation film according to claim 1, wherein the retardation value is positive at a wavelength of 400 nm and the retardation value is negative at 800 nm.

7. A retardation film according to claim 1 or 6, wherein the polymer film is a single polymer blend film comprising polyphenylene oxide and polystyrene.

8. A retardation film according to claim 7, wherein the polymer film is a single polymer blend film comprising 39–25% by mass of polyphenylene oxide and 61–75% by mass of polystyrene.

9. A retardation film according to claim 1, wherein the polymer film further contains up to 20% by mass of a low molecular compound with optical anisotropy.

10. A laminated retardation film formed by laminating a retardation film according to claim 1 as a first retardation film with a second retardation film which has a positive or negative retardation value at wavelengths from 400 to 700 nm.

11. A laminated retardation film according to claim 10, wherein the absolute value of the retardation of said second retardation film is smaller as the wavelength is shorter.

12. A laminated retardation film according to claim 10, wherein the retardation value is 1/4 wavelength at a wavelength of 550 nm.

13. A retardation film integrated polarizing film formed by laminating a retardation film or laminated retardation film according to claim 1 with a polarizing film.

14. A liquid crystal display device employing a retardation film-integrated polarizing film according to claim 13.

15. A liquid crystal display device employing a retardation film or laminated retardation film according to claim 1.

* * * * *